No. 767,992. PATENTED AUG. 16, 1904.
J. S. STONE.
SPACE TELEGRAPHY.
APPLICATION FILED JAN. 15, 1904.
NO MODEL.
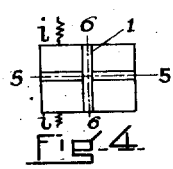
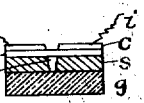
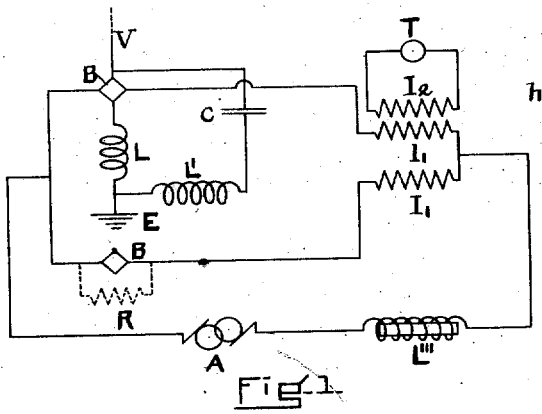
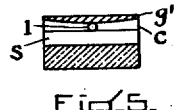
WITNESSES
INVENTOR
John Stone Stone
by Alex. P. Browne.
attorney No. 767,992. Patented August 16, 1904.

UNITED STATES PATENT OFFICE.

JOHN STONE STONE, OF CAMBRIDGE, MASSACHUSETTS, ASSIGNOR TO WILLIAM W. SWAN, TRUSTEE, OF BROOKLINE, MASSACHUSETTS.

SPACE TELEGRAPHY.

SPECIFICATION forming part of Letters Patent No. 767,992, dated August 16, 1904.

Original application filed November 25, 1903, Serial No. 182,628. Divided and this application filed January 15, 1904. Serial No. 189,164. (No model.)

*To all whom it may concern:*

Be it known that I, JOHN STONE STONE, a citizen of the United States, and a resident of Cambridge, in the county of Middlesex and State of Massachusetts, have invented a certain new and useful Improvement in Space Telegraphy, of which the following is a specification.

This invention relates to space or wireless telegraphy by electromagnetic waves in the form of electroradiant energy, and it relates more particularly to a method of receiving space-telegraph signals by means of electroreceptive or electric translating devices adapted to utilize in their operation the dissipative energy of the electrical oscillations or oscillatory electric currents developed by electromagnetic waves in the circuits in which such devices are included. Electroreceptive devices of such character have long been known for detecting and measuring the energy of electromagnetic waves, and they are generally known as "bolometers." In my application Serial No. 119,211 I have described the application of such electroreceptive devices to selective electric signaling and have therein pointed out that in order to be sensitive and rapidly responsive to changes in thermal condition the fine wires or strips of such bolometers should be of small thermal time constant compared with the thermal time constant of the bolometers heretofore used and that in order to be of small thermal time constant the fine wires or strips should have small mass—*i. e.*, they should be of short length and small section—low specific heat, and imperfect heat insulation. I have also pointed out that for greater efficiency the bolometer wires or strips should be of high-resistance temperature coefficient and of high specific resistance. I have also shown that as the oscillatory currents developed in the receiving-conductors of space-telegraph systems are of small amplitude it is necessary to employ some means whereby the currents developed in the receiving system by electromagnetic waves may be amplified in order that an appreciable amount of energy may be dissipated in the bolometer wires or strips without making the latter of excessively high resistance. For amplifying the currents developed in the receiving system by electromagnetic waves of a definite predetermined frequency I employ a resonant circuit or a group of resonant circuits attuned to such frequency. The resonant circuits strongly oppose the development therein of currents of frequencies different from that to which they are tuned, so that by means of such resonant circuits the bolometer fine wires or strips are protected from extraneous electrical forces which might otherwise destroy them. The reason the bolometer strip or wire is preferably made of a material having a high specific resistance is to obtain the smallest possible mass with wires or strips of a given resistance. Although the specific resistance of the material of which the wire or strip is preferably constructed should be high, the actual resistance of the wire or strip itself should be low, so as not to mask the resonant rise of current in the resonant circuit in which the wire or strip is included, as I have pointed out in my prior patents, in which other forms of receivers or wave-detectors are employed and in which I have shown that the selectivity of a resonant circuit varies inversely as the resistance of such circuit and is, in fact, equal to $\sqrt{\dfrac{L}{CR^2}}$.

By employing a resonant circuit it is possible to use bolometer wires or strips of much larger mass than it would otherwise be possible to use in order to effect the dissipation of a given amount of energy in said wires or strips. It is not possible to lay down any specific rule concerning the mass or geometric constants of the bolometer wire or strip, as such mass must be determined by the amount of energy radiated in the form of electromagnet waves and by the distance over which transmission is to take place, and as it must also be determined in a way by the locality in which the receiving-station is placed—*i. e.*, if the receiving-station is placed in a locality free from electromagnetic disturbances the wire or strip may be of smaller mass than if it be placed in a locality subject to frequent and violent electrical disturbances. By having regard to the electrical conditions surrounding the proposed receiving-station in designing the bolometer wire or strip the safety of the latter may be better insured, although it follows in a general way that more energy must be employed to transmit signals over a given distance when the bolometer wire or strip is required by the electrical characteristics of the locus of the receiving-station to be of larger mass than if the wire or strip is made of the minimum possible mass and therefore of the maximum sensitiveness.

Dr. Wollaston has described a method for producing wire of excessively small diameter, which method consists in incasing a fine platinum wire in silver, reducing the composite wire so formed, and then dissolving away the silver casing with warm nitrous acid. In this way wire of diameter as small as one fifty-thousandths of an inch was produced, as fully set forth in the *Encyclopedia Britannica* in an article entitled "Wire," to which all those wishing to practice my invention are referred for further details concerning the manufacture of wire suitable for use in the bolometer described herein, although such wire has long been in commercial use and may be obtained, and, in fact, is usually obtained, before the silver casing has been removed. Such wire so produced may be employed in the system herein described, and I also recommend the employment of a bolometer-strip produced as follows: A sheet of gold-leaf which may be one micron in thickness or greater is cast in a block of paraffin and sliced by a microtome into strips of any desired width, which may be as small as one micron in width after the manner in which stained sections well known in microscopic biology are produced. In lieu of the gold-leaf of commerce I may deposit gold electrolytically on a conducting backing, dissolve away the backing, and treat the resulting gold-leaf as above explained. The strips of gold-leaf produced by either process or a short length of platinum wire produced by the Wollaston process may be mounted for use in a bolometer in the following manner, so that a very small length of the strip or wire is operative as a source of resistance in the resonant circuit: On a perfectly plane glass plate deposit a silver film in the manner now well known, and upon this film of silver electrolytically deposit a much thicker film of some softer metal, as gold, copper, &c. The thickness of this second film is several times the thickness of the bolometer wire or strip. The surface so produced may be polished or burnished. Across the surface so produced a line should be scratched by an extremely fine-edged engraving instrument, dividing the surface into two parts electrically insulated from one another by the line so scratched, as shown by connecting the two surfaces to a battery and a highly-sensitive galvanometer. Across this scratch the bolometer wire or strip should be laid, so as to form an electrical connection between the two separated metal films, when a slightly convex surface of glass is pressed down on said strip or surface. The bolometer as now mounted is ready for use, the connections being made with the two metallic surfaces as terminals. The device is preferably maintained in an atmosphere of hydrogen or nitrogen or other gas which will not support combustion of the material of the bolometer strip or wire, said gas being preferably maintained at as low a temperature as practicable. By so maintaining the gas at such low temperature I can control a greater amount of current by a given change of resistance in the bolometer strip or wire, and so have a greater amount of energy available for the operation of the signal-indicating device. In order to maintain the balance of the Wheatstone bridge or induction-balance in which the bolometer is included, it is preferred to maintain this low temperature constant.

The drawings which accompany and form a part of this specification illustrate several forms of apparatus whereby the herein-described method may be conveniently carried out. This apparatus, however, forms no part of this invention, having been claimed in my application, Serial No. 182,628, filed November 25, 1903.

In the drawings, Figures 1, 2, and 3 illustrate in diagram arrangements of circuits and apparatus at a space-telegraph receiving-station. Fig. 4 is a plan view of the bolometer with the upper slightly convex glass plate removed. Fig. 5 is a section taken on lines 5 5 of Fig. 4. Fig. 6 is a section taken on lines 6 6 of Fig. 4.

V is an elevated conductor. M M' are transformers, preferably step down transformers. C C' are condensers. L L' are inductances. L'' L'' are choking-coils. L''' is an impedance. I' I' constitute the primary and I² the secondary windings of the induction-balance. T is a telephone or other signal-indicating device. B is a bolometer consisting of four wires or strips 1, 2, 3, and 4 of equal resistance. B' is a bolometer consisting of a single wire or strip. A is a source of rapidly-varying current, which may consist of an electrically-actuated tuning-fork carrying permanent magnets, the movement of which tuning-fork creates a rapidly-varying electromotive force in an associated circuit.

Referring to Figs. 4, 5, and 6, $g$ represents a perfectly plane glass plate, upon which a layer of silver $s$ is electrolytically deposited, and $c$ represents a somewhat thicker layer of softer metal, such as gold or copper, deposited on said layer of silver. $h$ represents the scratch produced by a very fine-edged engraving instrument across the aforesaid films. 1 represents the bolometer strip or wire connecting the two sections of the deposited metallic films. $g'$ represents the slightly convex plate of glass placed above the bolometer wire or strip 1, whereby the latter is caused to sink into the soft-metal film $c$ in order to make perfect electrical contact therewith. $i\ i$ are the leads connected to the upper films $c$, whereby the bolometer may be included in the resonant circuit. It is preferred to balance the induction-balance in which the bolometer is included by including in one arm thereof a resistance R, equal to the resistance of the bolometer B or B', included in the other arm of said balance, as indicated in dotted lines in Figs. 1, 2, and 3, although, as indicated, a bolometer identical with that in the resonant circuit may be used to balance the induction-balance. It is preferred to employ an impedance $L'''$ in the circuit of the source A.

The operation of the system is as follows: Electrical oscillations developed in the elevated conductor V by electromagnetic signal-waves the energy of which is to be received are conveyed to the closed resonant circuit C L' L B, C M L B, or C M L M' in Figs. 1, 2, and 3, respectively, said resonant circuits operating to greatly increase the amplitude of the oscillations, as I have pointed out in my prior patents. In Figs. 1 and 2 the electrical oscillations so amplified increase the temperature and therefore the resistance of the bolometer wires or strips, and this increase of resistance unbalances the induction-balance and effects the indication of a signal in the telephone or other signal-indicating device T. In Fig. 3 the electrical oscillations or currents developed in the resonant circuit C M L M' are translated to the resonant circuit C' M' L' B', attuned to the same frequency as the circuit C M L M', in which said currents operate to increase the resistance of the bolometer strip or wire B' with the result that an indication is produced in the device T due to the unbalancing of the induction-balance.

In the system shown in Fig. 2 the electrical oscillations developed by electromagnet waves in the elevated conductor V are inductively reproduced at increased current in the resonant circuit C M L B by means of the step-down transformer M, and in the system shown in Fig. 3 the electrical oscillations inductively reproduced at increased current in the resonant circuit C M L M' by means of the step-down transformer M are inductively reproduced at still further increased current in the second resonant circuit C' M' L' B' by means of the second step-down transformer M'.

It will be observed that the arrangement of the bolometer strips or wires in Figs. 1 and 2 is such as to prevent the electric oscillations developed in the resonant circuits from taking any path other than through the bolometer-strips, because said strips constitute a balanced Wheatstone bridge, at the equipotential points of which the connections to the induction-balance are made.

In Fig. 3, which shows another embodiment of my invention in which the wire or strip is employed, some means must be used to prevent the shunting of the electrical oscillations developed in the circuit M' L' B' C' around the bolometer wire or strip B' by way of the induction-balance. For this purpose I employ specially-designed inductance-coils L'' L'' placed in each of the arms of the induction-balance. These inductance or choking coils are wound so as to have the greatest possible inductance with the least possible electrostatic capacity. For this purpose the windings of said coils are separated and cores of finely-divided soft iron of the best magnetic quality, preferably cast in a dielectric matrix, are used. Heretofore in designing choking-coils a number of turns of fine insulated wire have been wound closely together upon an iron core, so that although such coil has a certain amount of inductance it usually behaves more like a condenser than like a coil having fixed resistance and inductance and no capacity. For this reason excessive displacement-currents are developed between the windings of such coils and a large portion of the energy of the high-frequency electrical oscillations is shunted around the receiver by way of said choking-coil instead of being confined to the circuit containing the receiver. With an inductance or choking coil designed as hereinbefore set forth the energy of the electrical oscillations in the resonant circuit containing the bolometer B' is practically entirely confined to said resonant circuit, and that portion of this energy which is shunted around said bolometer by way of the inductance-balance is practically rendered $nil$. Such a choking-coil is not limited in its use to the system herein described, but may be effectively employed wherever a choking-coil is required — as, for example, between a coherer and its local circuit.

I claim—

1. The method of receiving space-telegraph signals which consists in absorbing the energy of electromagnetic signal-waves in an elevated conductor, thereby creating electrical oscillations in said elevated conductor, causing said electrical oscillations to inductively reproduce similar oscillations in a resonant circuit, attuned to the frequency of the waves the energy of which is to be received, amplifying the electrical oscillations so reproduced by means of said resonant circuit, converting the energy of the said amplified electrical oscillations into thermal energy, and thereby controlling a signal-indicating device in accordance with the signals transmitted.

2. The method of receiving space-telegraph signals which consists in surrounding an electroreceptive device, adapted to utilize in its operation the dissipative energy of the electrical oscillations developed by electromagnetic waves in the circuit in which it is included, by an atmosphere of inert gas, utilizing the dissipative energy of the electrical oscillations created by electromagnetic signal-waves to vary the thermal condition of said electroreceptive device, and thereby controlling a signal-indicating device in accordance with the signals transmitted.

3. The method of receiving space-telegraph signals which consists in surrounding a bolometer fine wire or strip by an atmosphere of inert gas, utilizing the dissipative energy of the electrical oscillations created by electromagnetic signal-waves to vary the thermal condition of said fine wire or strip, and thereby controlling a signal-indicating device in accordance with the signals transmitted.

4. The method of receiving space-telegraph signals which consists in maintaining an electroreceptive device, adapted to utilize in its operation the dissipative energy of the electrical oscillations developed by electromagnetic waves in the circuit in which it is included, at a low temperature, utilizing the dissipative energy of the electrical oscillations created by electromagnetic signal-waves to vary the thermal condition of said electroreceptive device, and thereby controlling a signal-indicating device in accordance with the signals transmitted.

5. The method of receiving space-telegraph signals which consists in maintaining a bolometer fine wire or strip at a low temperature, utilizing the dissipative energy of the electrical oscillations created by electromagnetic signal-waves to vary the thermal condition of said fine wire or strip, and thereby controlling a signal-indicating device in accordance with the signals transmitted.

6. The method of receiving space-telegraph signals which consists in absorbing the energy of electromagnetic signal-waves in an elevated conductor, thereby creating electrical oscillations in said elevated conductor, causing said electrical oscillations to inductively reproduce similar oscillations at increased current in a resonant circuit, attuned to the frequency of the waves the energy of which is to be received, amplifying said electrical oscillations so reproduced by means of said resonant circuit, converting the energy of said amplified oscillations into thermal energy and thereby controlling a signal-indicating device in accordance with the signals transmitted.

7. The method of receiving space-telegraph signals which consists in absorbing the energy of electromagnetic signal-waves in an elevated conductor, thereby creating electrical oscillations in said elevated conductor, causing said electrical oscillations to inductively reproduce similar oscillations at increased current in a resonant circuit, attuned to the frequency of the waves the energy of which is to be received, amplifying said electrical oscillations so reproduced by means of said resonant circuit, causing the electrical oscillations so amplified to inductively reproduce similar oscillations at still further increased current in a second resonant circuit, likewise attuned to the frequency of the waves the energy of which is to be received, amplifying said electrical oscillations so reproduced by means of said second resonant circuit, converting the energy of said amplified oscillations into thermal energy and thereby controlling a signal-indicating device in accordance with the signals transmitted.

In testimony whereof I have hereunto subscribed my name this 15th day of January, 1904.

JOHN STONE STONE.

Witnesses:
HUGH M. STERLING,
ARTHUR L. BRYANT

---

It is hereby certified that in Letters Patent No. 767,992, granted August 16, 1904, upon the application of John Stone Stone, of Cambridge, Massachusetts, for an improvement in "Space Telegraphy," an error appears in the printed specification requiring correction, as follows: On page 3, line 48, the word "electromagnet" should read *electromagnetic;* and that the said Letters Patent should be read with this correction therein that the same may conform to the record of the case in the Patent Office.

Signed and sealed this 11th day of July, A. D., 1905.

[SEAL.]

F. I. ALLEN,
*Commissioner of Patents.* operation the dissipative energy of the electrical oscillations developed by electromagnetic waves in the circuit in which it is included, by an atmosphere of inert gas, utilizing the dissipative energy of the electrical oscillations created by electromagnetic signal-waves to vary the thermal condition of said electroreceptive device, and thereby controlling a signal-indicating device in accordance with the signals transmitted.

3. The method of receiving space-telegraph signals which consists in surrounding a bolometer fine wire or strip by an atmosphere of inert gas, utilizing the dissipative energy of the electrical oscillations created by electromagnetic signal-waves to vary the thermal condition of said fine wire or strip, and thereby controlling a signal-indicating device in accordance with the signals transmitted.

4. The method of receiving space-telegraph signals which consists in maintaining an electroreceptive device, adapted to utilize in its operation the dissipative energy of the electrical oscillations developed by electromagnetic waves in the circuit in which it is included, at a low temperature, utilizing the dissipative energy of the electrical oscillations created by electromagnetic signal-waves to vary the thermal condition of said electroreceptive device, and thereby controlling a signal-indicating device in accordance with the signals transmitted.

5. The method of receiving space-telegraph signals which consists in maintaining a bolometer fine wire or strip at a low temperature, utilizing the dissipative energy of the electrical oscillations created by electromagnetic signal-waves to vary the thermal condition of said fine wire or strip, and thereby controlling a signal-indicating device in accordance with the signals transmitted.

6. The method of receiving space-telegraph signals which consists in absorbing the energy of electromagnetic signal-waves in an elevated conductor, thereby creating electrical oscillations in said elevated conductor, causing said electrical oscillations to inductively reproduce similar oscillations at increased current in a resonant circuit, attuned to the frequency of the waves the energy of which is to be received, amplifying said electrical oscillations so reproduced by means of said resonant circuit, converting the energy of said amplified oscillations into thermal energy and thereby controlling a signal-indicating device in accordance with the signals transmitted.

7. The method of receiving space-telegraph signals which consists in absorbing the energy of electromagnetic signal-waves in an elevated conductor, thereby creating electrical oscillations in said elevated conductor, causing said electrical oscillations to inductively reproduce similar oscillations at increased current in a resonant circuit, attuned to the frequency of the waves the energy of which is to be received, amplifying said electrical oscillations so reproduced by means of said resonant circuit, causing the electrical oscillations so amplified to inductively reproduce similar oscillations at still further increased current in a second resonant circuit, likewise attuned to the frequency of the waves the energy of which is to be received, amplifying said electrical oscillations so reproduced by means of said second resonant circuit, converting the energy of said amplified oscillations into thermal energy and thereby controlling a signal-indicating device in accordance with the signals transmitted.

In testimony whereof I have hereunto subscribed my name this 15th day of January, 1904.

JOHN STONE STONE.

Witnesses:
HUGH M. STERLING,
ARTHUR L. BRYANT

---

Corrections in Letters Patent No. 767,992.

It is hereby certified that in Letters Patent No. 767,992, granted August 16, 1904, upon the application of John Stone Stone, of Cambridge, Massachusetts, for an improvement in "Space Telegraphy," an error appears in the printed specification requiring correction, as follows: On page 3, line 48, the word "electromagnet" should read *electromagnetic;* and that the said Letters Patent should be read with this correction therein that the same may conform to the record of the case in the Patent Office.

Signed and sealed this 11th day of July, A. D., 1905.

[SEAL.]

F. I. ALLEN,
*Commissioner of Patents.*

Corrections in Letters Patent No. 767,992.

It is hereby certified that in Letters Patent No. 767,992, granted August 16, 1904, upon the application of John Stone Stone, of Cambridge, Massachusetts, for an improvement in "Space Telegraphy," an error appears in the printed specification requiring correction, as follows: On page 3, line 48, the word "electromagnet" should read *electromagnetic;* and that the said Letters Patent should be read with this correction therein that the same may conform to the record of the case in the Patent Office.

Signed and sealed this 11th day of July. A. D.. 1905.

[SEAL.]

F. I. ALLEN,
*Commissioner of Patents.*